US009418285B2

(12) United States Patent
Murase et al.

(10) Patent No.: US 9,418,285 B2
(45) Date of Patent: Aug. 16, 2016

(54) INFORMATION PROCESSING APPARATUS AND INPUT CONTROL METHOD

(71) Applicant: FUJITSU LIMITED, Kawasaki-shi, Kanagawa (JP)

(72) Inventors: Taichi Murase, Kawasaki (JP); Katsuhito Fujimoto, Kawasaki (JP); Takehiro Nakai, Kawasaki (JP); Nobuyuki Hara, Meguro (JP); Noriaki Ozawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 229 days.

(21) Appl. No.: 14/105,537

(22) Filed: Dec. 13, 2013

(65) Prior Publication Data
US 2014/0105455 A1 Apr. 17, 2014

Related U.S. Application Data

(63) Continuation of application No. PCT/JP2011/064457, filed on Jun. 23, 2011.

(51) Int. Cl.
G06K 9/00 (2006.01)
G06F 3/042 (2006.01)
G06F 3/00 (2006.01)
G06F 3/01 (2006.01)
G06F 3/023 (2006.01)

(52) U.S. Cl.
CPC ............ G06K 9/00523 (2013.01); G06F 3/005 (2013.01); G06F 3/017 (2013.01); G06F 3/0233 (2013.01); G06F 3/0426 (2013.01); G06K 9/00201 (2013.01); G06K 9/00355 (2013.01); G06K 9/00389 (2013.01)

(58) Field of Classification Search
None
See application file for complete search history.

(56) References Cited

U.S. PATENT DOCUMENTS

| 5,767,842 | A | 6/1998 | Korth | |
|---|---|---|---|---|
| 2004/0207732 | A1* | 10/2004 | Lieberman | G06F 1/1626 348/207.99 |
| 2010/0214226 | A1* | 8/2010 | Brown | G09B 13/04 345/168 |

(Continued)

FOREIGN PATENT DOCUMENTS

| JP | 06-083512 | 3/1994 |
|---|---|---|
| JP | 11-305895 | 11/1999 |

(Continued)

OTHER PUBLICATIONS

International Search Report, mailed in connection with PCT/JP2011/064457 and mailed Aug. 30, 2011.

Primary Examiner — Stephen R Koziol
Assistant Examiner — Raphael Schwartz
(74) Attorney, Agent, or Firm — Fujitsu Patent Center

(57) ABSTRACT

An information processing apparatus includes an image capturing section to capture an image of a hand; an extracting section to extract a hand area from the captured image; a reference line determining section to determine a reference pushdown line in the image on the hand area; a determining section to determine a pushdown move if the bottom part of the hand area comes below the reference pushdown line; a first position determining section to determine a depth position based on an aspect ratio of the hand area if the pushdown move is determined; a second position determining section to determine a lateral position based on a position of the bottom part of the hand area if the pushdown move is determined; and an input key determining section to determine an input key from the determined depth position and lateral position.

10 Claims, 14 Drawing Sheets

(56) References Cited

U.S. PATENT DOCUMENTS

| | | | |
|---|---|---|---|
| 2010/0231522 A1* | 9/2010 | Li | G06F 3/0423 345/169 |
| 2011/0142353 A1* | 6/2011 | Hoshino | G06K 9/628 382/203 |

FOREIGN PATENT DOCUMENTS

| | | |
|---|---|---|
| JP | 2001-282428 | 10/2001 |
| JP | 2003-288156 | 10/2003 |
| JP | 2008-152622 | 7/2008 |

* cited by examiner

FIG.4
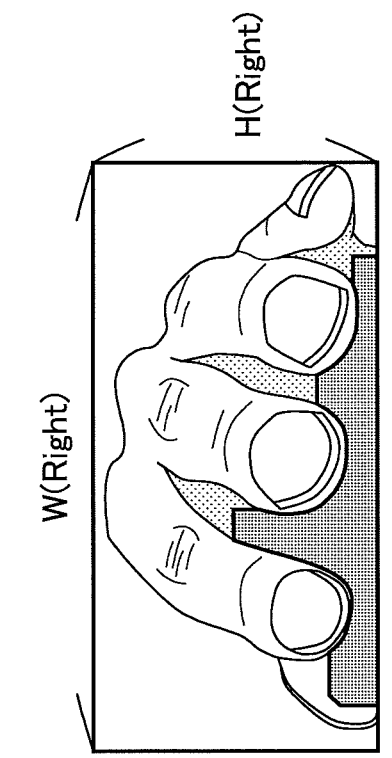
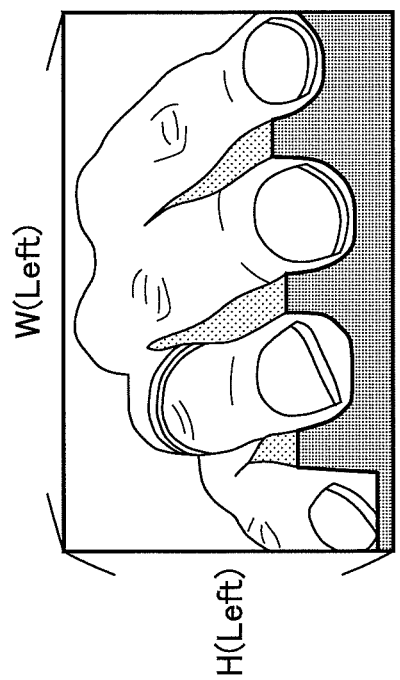

FIG.5

| Q | W | E | R | T | Y | U | I | O | P |
|---|---|---|---|---|---|---|---|---|---|
| A | S | D | F | G | H | J | K | L | ; |
| Z | X | C | V | B | N | M | , | . | / |

INFORMATION PROCESSING APPARATUS AND INPUT CONTROL METHOD

CROSS-REFERENCE TO RELATED APPLICATIONS

This application is a continuation application of International Application PCT/JP2011/064457 filed on Jun. 23, 2011 and designated the U.S., the entire contents of which are incorporated herein by reference.

FIELD

The disclosures herein generally relate to an information processing apparatus, an input control method and an input control program that control key inputs without using a physical keyboard.

BACKGROUND

In recent years, keyboardless devices have become widely used that include smart phones and tablet-type devices such as a slate PC (Personal Computer) and an iPad (trademark). However, such keyboardless devices are not implemented with a character input interface that has a competitive operational feeling like a QWERTY-type physical keyboard, which is one of the most significant disadvantages for a user who needs to input a long passage.

For portable terminals such as a smart phone and the like, an input interface using a numeric keypad is most widely used that may be implemented with a touch panel or a physical keypad. If the number of types of characters is greater than the number of keys displayed on a screen, a key is assigned with multiple character types where a character is selected by pushing down the key one or more times. For example, a ten-key numeric keypad is displayed on a screen in which a key labeled with "2" has "A", "B" and "C" assigned, with which one of the characters is selected by pushing down the key for a predetermined number of times.

Also, iPhone (trademark) is provided with an interface called "flick input". With flick input, if a predetermined key is pushed down, characters assigned to the key are displayed on the left, right, top and bottom of the key.

For example, a ten-key numeric keypad is displayed on a screen in which a key labeled with "2" has "A", "B" and "C" assigned, and if "A" is pushed down, "B" and "C" are displayed on the left and top of "A", respectively. By lifting up the pushing finger at the position of one of the keys, the character type at the position is selected. Flick input can make the number of key pushes fewer than the method of selecting a character by multiple pushes.

The input methods described above allow input with one hand, which may be suitable for input operations during travel such as a train ride or for input of a short sentence. However, as portable terminals become smaller and so do character input areas on the terminals, operability of the keys become worse, especially when inputting a long sentence.

As for tablet-type devices, comparatively larger touch panel displays, such as a 10-inch type, are usually adopted, on which a software keyboard, for example, a QWERTY-type full keyboard, is displayed.

If such a software keyboard is displayed on a tablet-type device with a practical size, the keyboard may occupy a large display area on the screen, which makes it difficult to view an application display.

Regarding this matter, there is a technology for key inputs that detects positions of fingertips on a virtual keyboard. For example, fingertips of an operator are captured using two cameras, and three dimensional positions of the fingertips are detected from the captured images, with which keys on the virtual keyboard corresponding to the positions are determined (Patent Documents 1 and 2).

RELATED-ART DOCUMENTS

Patent Documents

[Patent Document 1] Japanese Laid-open Patent Publication No 2001-282428
[Patent Document 2] Japanese Laid-open Patent Publication No 2003-288156

With such a conventional technology, although a physical keyboard is not required, two cameras are required instead. In the first place, a terminal without a physical keyboard (also called a "physical keyboardless terminal") is targeted for a thin, small device by not installing a physical keyboard.

However, the conventional technology needs two cameras installed for detecting three dimensional movement, with which images of fingers of an operator need to be captured from the front and from above that restricts mount positions of the two cameras. Therefore, a device installed with two cameras at limited mount positions does not have an advantage in terms of portability and cost.

SUMMARY

According to at least one embodiment of the present invention, an information processing apparatus includes an image capturing section to capture an image of a hand; an extracting section to extract a hand area from the captured image; a reference line determining section to determine a reference pushdown line in the image on the hand area; a determining section to determine a pushdown move if the bottom part of the hand area comes below the reference pushdown line; a first position determining section to determine a depth position based on an aspect ratio of the hand area if the pushdown move is determined; a second position determining section to determine a lateral position based on a position of the bottom part of the hand area if the pushdown move is determined; and an input key determining section to determine an input key from the determined depth position and lateral position.

The object and advantages of the embodiment will be realized and attained by means of the elements and combinations particularly pointed out in the claims. It is to be understood that both the foregoing general description and the following detailed description are exemplary and explanatory and are not restrictive of the invention as claimed.

BRIEF DESCRIPTION OF DRAWINGS

FIG. 4 is a schematic view illustrating an example of extracted hand areas;
FIG. 5 is a schematic view illustrating an example of a virtual keyboard.

DESCRIPTION OF EMBODIMENTS

Figure 1:
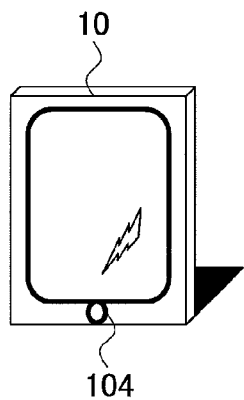
FIG. 1 is a schematic view illustrating an example of a use case of an information processing apparatus according to an embodiment.

First, a use case of an information processing apparatus will be described according to embodiments. FIG. 1 is a schematic view illustrating an example of a use case of the information processing apparatus 10 according to the embodiments. In the example illustrated in FIG. 1, for example, a camera 104 of the information processing apparatus 10 is positioned in a lower part, and the information processing apparatus 10 is set in an upright state with respect to a plane. At this moment, a user puts both hands within a range that can be captured by the camera 104, and simulates operations on a keyboard. In this case, it is desirable that the user can do touch typing.

The camera 104 captures images of movements of both hands of the user. The information processing apparatus 10 estimates and detects three dimensional positions of fingertips of the hands from the captured images taken by the camera 104. The information processing apparatus 10 determines keys depending on the detected three dimensional positions to receive key inputs.

The information processing apparatus 10 is a physical keyboardless terminal, for example, a smart phone, a slate PC, a tablet-type device, or the like. In the following, the embodiments of the present invention will be described with reference to the drawings. According to at least one embodiment of the present invention, it is possible to determine an input command depending on a three dimensional position of a finger where the position is estimated based on a captured image taken by a camera in a single direction.

[First Embodiment]

<Hardware>

Figure 2:
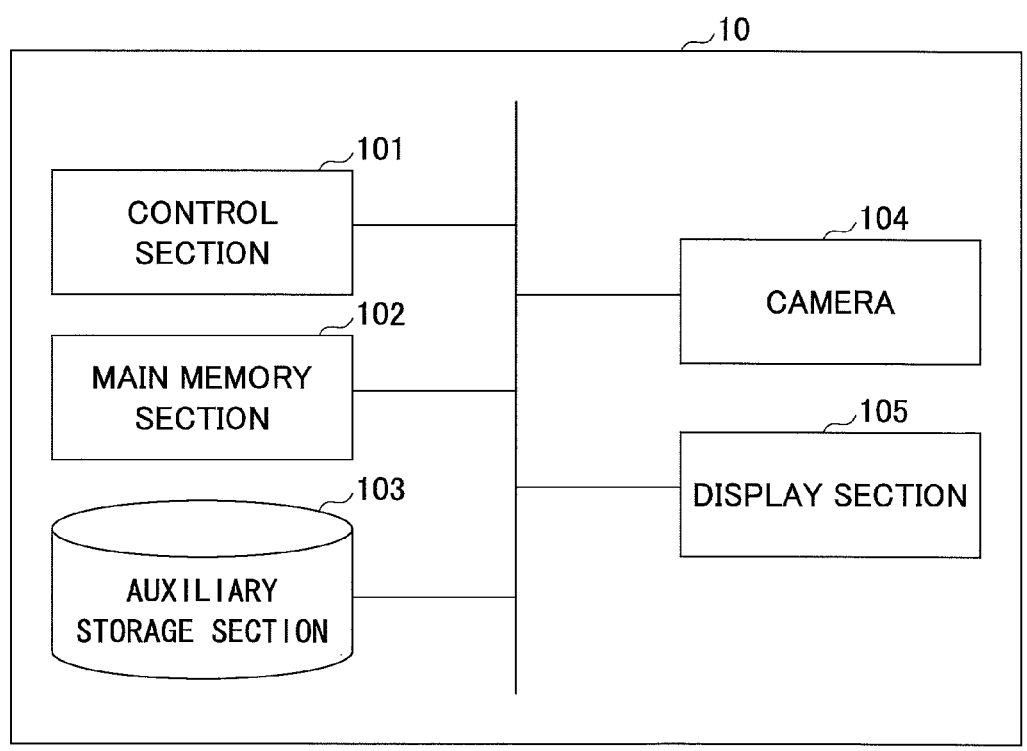
FIG. 2 is a schematic view illustrating an example of hardware of an information processing apparatus.

FIG. 2 is a schematic view illustrating an example of hardware of the information processing apparatus 10. The information processing apparatus 10 illustrated in FIG. 1 includes a control section 101, a main memory section 102, an auxiliary storage section 103, a camera 104, and a display section 105. These sections are connected with each other via a bus for data transmission and reception.

The control section 101 is a CPU (Central Processing Unit) that controls devices and operates on data. Also, the control section 101 is an execution unit that executes a program stored in the main memory section 102 or the auxiliary storage section 103. Also, the control section 101 operates and processes input data to output it to the display section 105, the auxiliary storage section 103, or the like.

The main memory section 102 is a ROM (Read-Only Memory), a RAM (Random Access Memory) and the like, which is a storage device to store or to temporarily store an OS, or the basic software, programs such as application software or the like, and data.

The auxiliary storage section 103 is an HDD (Hard Disk Drive) or the like, which is a storage device to store data related to the application software and the like.

The camera 104 includes, for example, a CCD (Charge Coupled Device) sensor or a CMOS (Complementary Metal Oxide Semiconductor) sensor to capture, for example, hands of a user.

The display section 105 is configured with an LCD (Liquid Crystal Display) or the like, to display data input from the control section 101.

Here, although the embodiments are described with the example in which the information processing apparatus 10 has the camera 104 built in, the camera 104 is not necessarily a mandatory element of the information processing apparatus 10. The information processing apparatus 10 may be connected with an external camera to capture an image from the camera by the control section 101.

Also, the information processing apparatus 10 may further include a drive device as an interface to a recording medium, a network interface section to communicate with other devices, and the like.

For example, the drive device reads a program from a recording medium (for example, a flexible disk) to install it into the auxiliary storage section 103.

Also, a recording medium stores a predetermined program, which is installed into the information processing apparatus 10 via the drive device. The installed predetermined program can be executed by the information processing apparatus 10.

The network interface section is an interface between a peripheral device, which has a communication function connected with a network such as a LAN (Local Area Network) or a WAN (Wide Area Network) configured with wired and/or wireless network data transmission lines, and the information processing apparatus 10.

<Functions>

Figure 3:
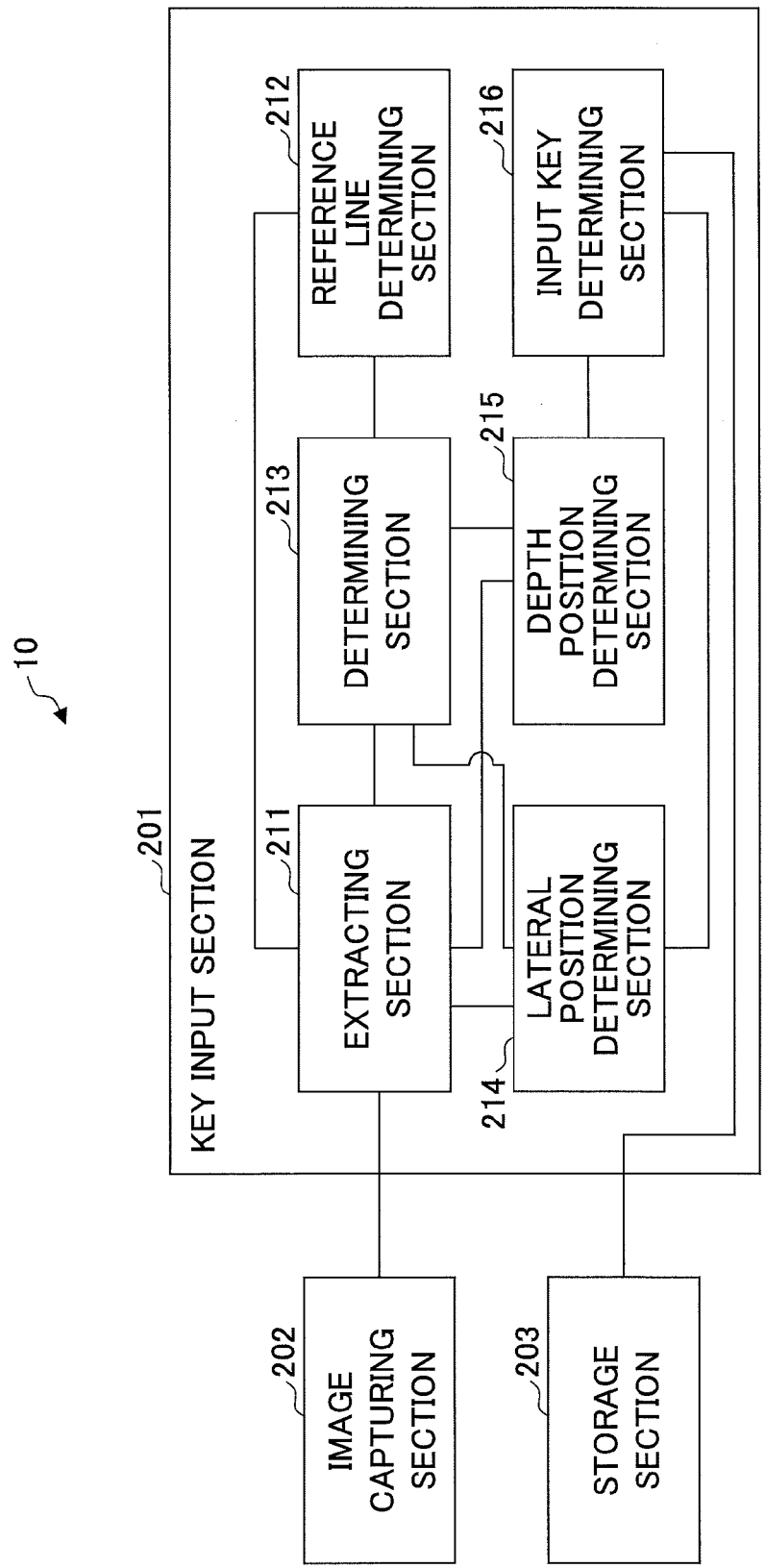
FIG. 3 is a block diagram illustrating an example of functions of an information processing apparatus.

FIG. 3 is a block diagram illustrating an example of functions of the information processing apparatus 10. In the example illustrated in FIG. 3, the information processing apparatus 10 includes a key input section 201, an image capturing section 202, and a storage section 203.

The key input section 201 may be implemented by, for example, the control section 101 and the main memory section 102 as a working memory, the image capturing section 202 may be implemented by, for example, the camera 104, and the storage section 203 may be implemented by, for example, the main memory section 102 or the auxiliary storage section 103.

The image capturing section 202 captures an image having a range, for example, including hands of a user. The key input section 201 obtains the captured image from the image capturing section 202, detects three dimensional positions of fingers in the captured image, and determines an input command based on the three dimensional positions of the fingers. The input command is, for example, a character code. The input command is stored into the storage section 203.

The storage section 203 stores data obtained from the key input section 201, for example, an input command.

Next, the key input section 201 will be described in detail. The key input section 201 includes an extracting section 211, a reference line determining section 212, a determining section 213, a lateral position determining section 214, a depth position determining section 215, and an input key determining section 216.

Here, functions of the sections will be described that are relevant to a calibration procedure and a key input procedure, which are parts of an input control procedure executed by the information processing apparatus 10 according to the first embodiment.

(Calibration Procedure)

The calibration procedure is executed when a user places both hands at home positions in front of the camera 104 while the input control procedure is being executed. For example, a user may place both hands on a desk.

The extracting section 211 extracts an area of hands (also called a "hand area") from the captured image input from the image capturing section 202. Extraction of a hand area from the captured image may be done with a method based on extracting a flesh color of hands, a method based on characteristic values of the form of hands registered in advance, and the like.

Also, the extracting section 211 may delete a palm area from a hand area as will be described later. To delete a palm area, for example, edges of fingers may be extracted. Although it is assumed that a palm area is deleted from a hand area in the following example, a palm area does not necessarily need to be deleted. A hand area may be extracted by one of the publicly known technologies.

The extracting section 211 calculates an aspect ratios R of left and right hand areas. Aspect ratios R are obtained with formula (1), (2). For example, the extracting section 211 may obtain a circumscribed rectangle of a hand area and calculate the aspect ratio of the circumscribed rectangle for calculating the aspect ratio of the hand area.

$$RR=H\text{ (Right)}/W\text{(Right)} \qquad \text{formula (1)}$$

$$RL=H\text{ (Left)}/W\text{(Left)} \qquad \text{formula (2)}$$

RR: aspect ratio of a right hand
H (Right): tallness (height) of the right hand
W (Right): broadness (width) of the right hand
RL: aspect ratio of a left hand
H (Left): tallness (height) of the left hand
W (Left): broadness (width) of the left hand Here, the extracting section 211 may calculate the average value of RR and RL and use it as the aspect ratio.

FIG. 4 is a schematic view illustrating an example of extracted hand areas. As illustrated in FIG. 4, from a captured image taken by the image capturing section 202, hand areas are extracted by the extracting section 211 to calculate the aspect ratios of the left and right hand areas.

Here, in the example illustrated in FIG. 4, although the thumb of the left hand is not detected as it is behind the other fingers, it is not a problem because thumbs have little influence on a key push of an alphanumeric key.

The extracting section 211 also calculates threshold values used for determining a depth position, using aspect ratios R. The extracting section 211 calculates threshold values TH, for example, by multiplying predetermined coefficients by an aspect ratio R for each hand. The threshold values TH are obtained by the following formulas (3)-(6). TH is a generic symbol for the following threshold values.

$$THUR=RR\times X1 \qquad \text{formula (3)}$$

$$THDR=RR\times X2 \qquad \text{formula (4)}$$

$$THUL=RL\times X1 \qquad \text{formula (5)}$$

$$THDL=RL\times X2 \qquad \text{formula (6)}$$

THUR: upper row (Up), right hand (Right) threshold value
THDR: lower row (Down), right hand (Right) threshold value
THUL: upper row (Up), left hand (Left) threshold value
THDL: lower row (Down), left hand (Left) threshold value
X1: a value less than 1 (X1<1.0)
X2: a value greater than 1 (X2>1.0)
where the origin is taken at the upper left corner of an image.

Here, X1 and X2 are values proportionate to an amount of movement of fingers in the depth direction, which may be adjusted with a usability felt by a user, or may be set beforehand. If it is set beforehand, X1 is set to, for example, 0.8, and X2 is set to, for example, 1.2.

The extracting section 211 outputs the calculated threshold values TH to the depth position determining section 215. Here, calculation of the threshold values may not be executed by the extracting section 211, but by the depth position determining section 215 that has obtained the aspect ratios R from the extracting section 211.

Referring to FIG. 3 again, the reference line determining section 212 determines a reference position for determining a key pushdown move. The reference position is called a "reference pushdown line". The reference line determining section 212 determines a reference pushdown line based on hand areas extracted by the extracting section 211.

The reference line determining section 212 for example, may detect fingertips from the extracted hand areas and obtain an approximate line that connects the fingertip to set the line as a reference pushdown line. In this case, positions of fingers that are placed on a desk by a user are set as a reference pushdown line, which enables the user to operate on the desk as if it were a keyboard, and the user may feel an improved operability.

Figure 5:
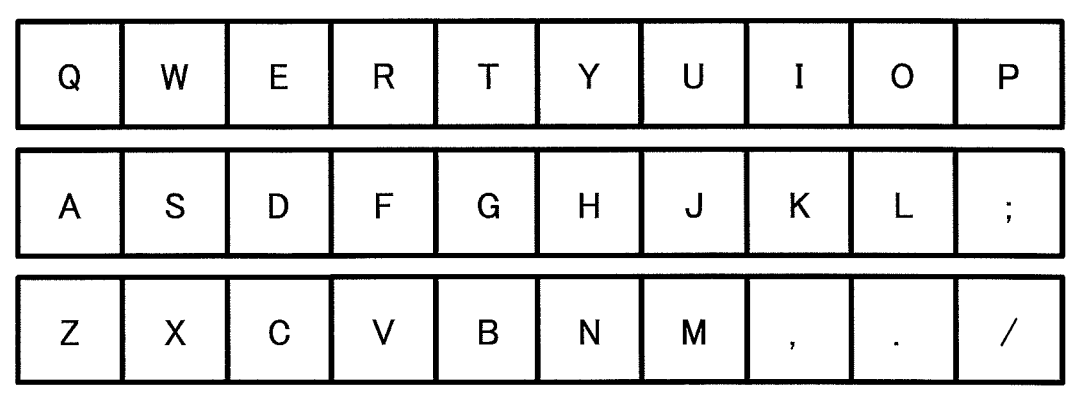

FIG. 5 is a schematic view illustrating an example of a virtual keyboard. Although three row of a QWERTY-type keyboard are illustrated in the example in FIG. 5, the number of rows is not limited to three, but may be four, five, or the like.

The reference line determining section 212 may set a reference pushdown line with positions that are taken by fingertips of a user when the user inputs with keys on the row closest to the user (for example, Z, X or the like in FIG. 5) because these positions are located the highest (uppermost) in a two dimensional captured image.

Figure 6:
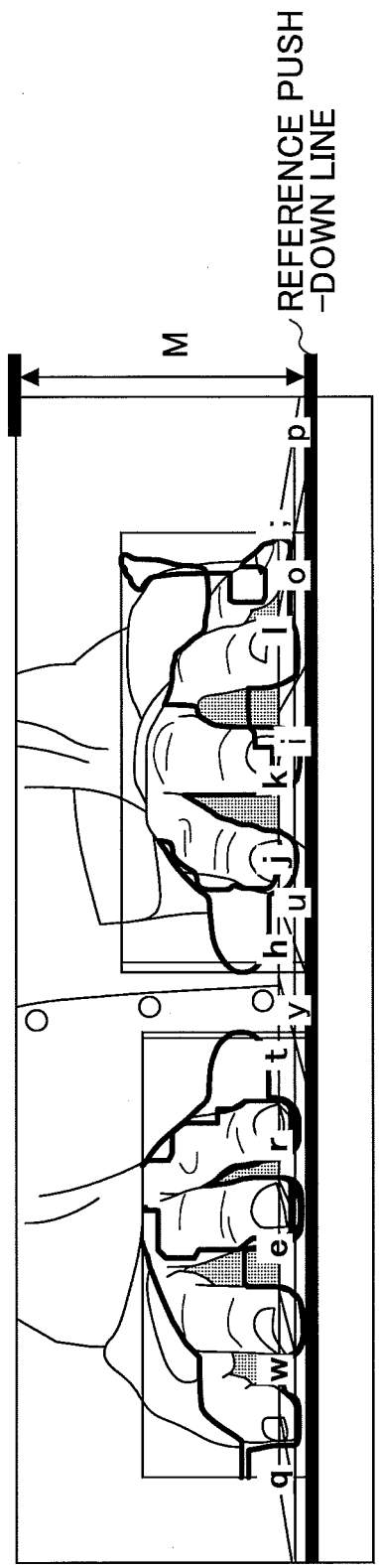
FIG. 6 is a schematic view illustrating an example of a reference pushdown line.

FIG. 6 is a schematic view illustrating an example of a reference pushdown line. The reference pushdown line illustrated in FIG. 6 has a distance M from the upper end of the image. In the example illustrated in FIG. 6, the reference pushdown line is set with positions of fingertips at home positions (assuming that the fingertips are placed on keys in the middle row illustrated in FIG. 5).

Here, for a virtual keyboard with three rows as illustrated in FIG. 5, the reference line determining section 212 may detect a position of hands (M) when inputting with the middle row, multiply M by a coefficient a that is obtained with the aspect ratio R when inputting with the lower row, and use the multiplied value as a reference pushdown line.

Also, in the example illustrated in FIG. 6, although the same reference pushdown line is used for left and right hands, left and right hands may be set with respective reference pushdown lines. In this case, the reference line determining section 212 may obtain approximate lines by connecting fingertips of left and right hands, respectively.

The aspect ratio R (for the lower row) is a value that may represent a distance in the depth direction (closeness to a user), namely, a greater value of R makes the reference pushdown line set deeper in the depth direction, with which a key pushdown move in the lower row can be detected appropriately.

The reference line determining section 212 indicates the determined position of a reference pushdown line (for example, the distance M from the upper end of the image) to the determining section 213.

The calibration procedure is executed as described above. The calibration procedure is a procedure for setting M used for a reference pushdown line required for a key input procedure, and threshold values TH. Here, if a user's identification information such as the fingerprint is associated with M and the threshold values TH and stored into the storage section 203, the calibration procedure does not need to be executed every time.

(Key Input Procedure)

The image capturing section 202 captures movements of hands of a user to output an image to the extracting section 211. The extracting section 211, similarly to the calibration procedure, extracts hand areas from the image input from the image capturing section 202. Also, the extracting section 211 calculates the aspect ratios R' (current aspect ratios) of the extracted hand areas.

The extracting section 211 outputs the extracted hand areas to the determining section 213 and the lateral position determining section 214, and outputs the calculated aspect ratios R' to the depth position determining section 215.

The determining section 213 illustrated in FIG. 3 compares the reference pushdown line indicated by the reference line determining section 212 with the bottom part of the hand area extracted by the extracting section 211, and determines a key pushdown move if the bottom part is at a position lower than the reference pushdown line. Here, "the bottom part is at a position lower than the reference pushdown line" means that the bottom part comes below the reference pushdown line in the image.

Here, if the coordinate system has the origin at the upper left position of the captured image and the vertical coordinate value increases in the downward direction, the determining section 213 determines a key pushdown move if the bottom part in the vertical direction is greater than the coordinate value of M.

The determining section 213 does not determines a key pushdown move if the vertical coordinate value of the bottom part is less than the coordinate value of M, namely, if the bottom part is not below the reference pushdown line.

The determining section 213 determines that a next key pushdown move takes place if a condition is satisfied that the bottom part moves above the reference pushdown line that has first been below the reference pushdown line. For example, the determining section 213 starts determining a next key pushdown move if the bottom part moves above the reference pushdown line that has first been below the reference pushdown line.

Figure 7:
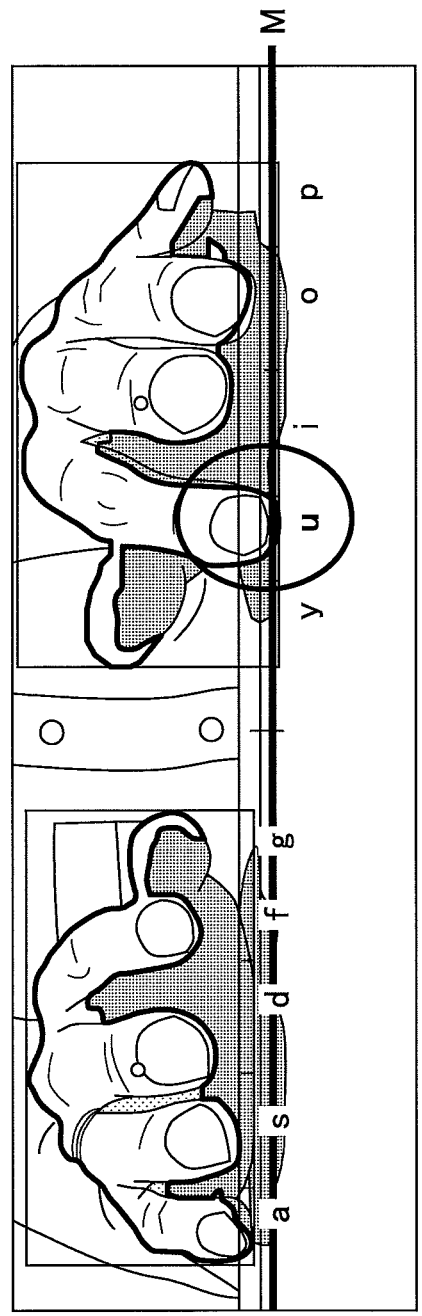
FIG. 7 is a schematic view illustrating an example of a key pushdown move.

FIG. 7 is a schematic view illustrating an example of a key pushdown move. In the example illustrated in FIG. 7, the index finger of the right hand of a user comes below the reference pushdown line, which makes the determining section 213 determine the key pushdown move. In this case, the coordinate value of the index finger in the vertical direction is greater than M.

Once determining a key pushdown move, the determining section 213 indicates the key pushdown move to the lateral position determining section 214 and the depth position determining section 215.

Referring to FIG. 3 again, in response to an indication of a key pushdown move, the lateral position determining section 214 determines the lateral position based on the position of the bottom part of the hand area extracted by the extracting section 211.

For example, the lateral position determining section 214 calculates a position of the bottom part relative to the width of the hand area. When inputting with the keys illustrated in FIG. 5, each hand is allocated five columns of keys because there are ten columns of keys in the lateral direction.

The lateral position determining section 214 divides the width of each of the hand areas by five, and allocates one key to each of the partitioned areas. The lateral position determining section 214 determines which one of the five partitioned areas includes the position of the bottom part.

Here, partitioning may be done evenly or done with ratios that take characteristics of the fingers of a user into account. The ratios that take characteristics of the fingers of a user into account depend on, for example, the positions and sizes of the fingers of the user, with which the ratio of the area between the index finger and the middle finger may be set wider than other areas. Also, partitioning may be done by a method specified by a user.

Figure 8:
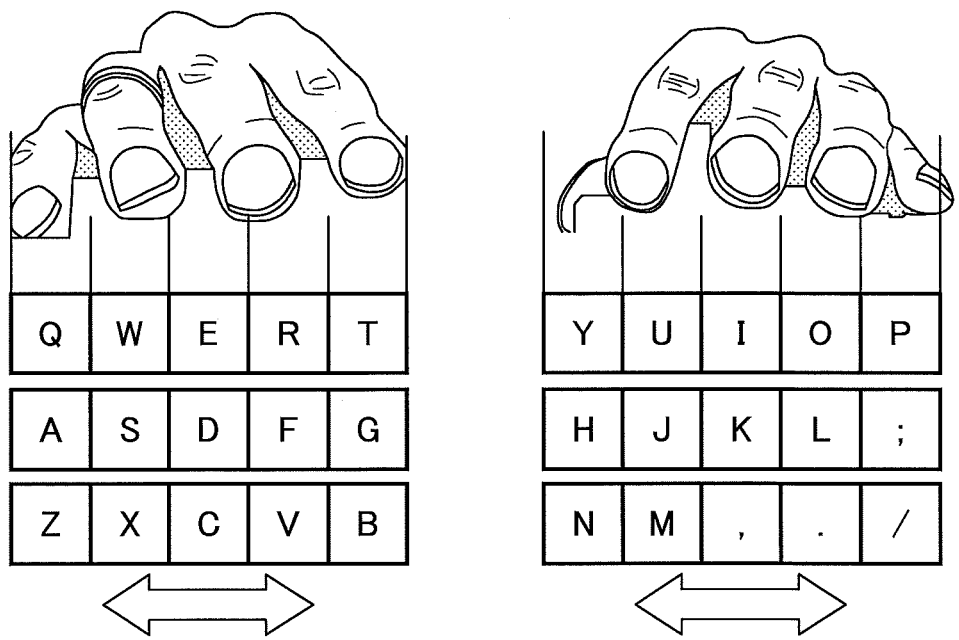
FIG. 8 is a schematic view illustrating an example of hand areas evenly partitioned.

FIG. 8 is a schematic view illustrating an example of hand areas evenly partitioned. As illustrated in FIG. 8, the width of each of the hand areas is divided by five, and one column of keys is allocated to each of the partitioned areas. With this partitioning, the lateral position determining section 214 determines the lateral position of the pushing finger.

Once the lateral position of the pushing finger is determined, a candidate column of the input key is determined. The lateral position determining section 214 outputs the determined lateral position to the input key determining section 216. With the example illustrated in FIG. 7, the lateral position determining section 214 determines that the area second to the leftmost for the right hand is the lateral position, and outputs the column of "u" to the input key determining section 216.

Referring to FIG. 3 again, the depth position determining section 215 obtains the threshold values TH calculated by the extracting section 211 during the calibration procedure.

Figure 9:
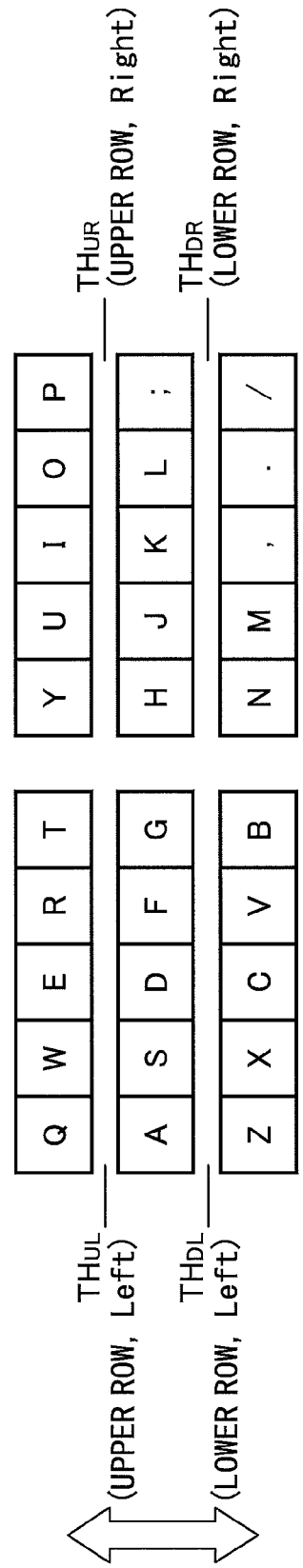
FIG. 9 is a schematic view illustrating an example of threshold values.

FIG. 9 is a schematic view illustrating an example of threshold values TH. As illustrated in FIG. 9, the threshold values TH are used for determining the depth direction of a virtual keyboard. The virtual keyboard illustrated in FIG. 9 has a front row from the user's viewpoint (the lower row in a captured image) including Z and N, a middle row from the user's viewpoint (the middle row in the captured image) including A and H, and a back row from the user's viewpoint (the upper row in the captured image) including Q and Y.

The depth position determining section 215 compares the aspect ratio R' (current aspect ratio) of a hand area taken when a key pushdown move is determined by the determining section 213, with the threshold values TH of the same hand with which the key pushdown move has been determined. For example, suppose that a key pushdown move with a right hand is determined. In this case, the depth position determining section 215 determines that the row of the key pushdown move is:

the lower row if RR'>THDR;

the middle row if THUR≤RR'≤THDR; or the upper row if RR'<THUR.

The reason why the row can be determined as above will be described with reference to FIG. 10. When inputting with a key in the upper row of the virtual keyboard, a finger is stretched in the direction towards the camera 104 in front, which makes the hand area take a form flattened in the vertical direction. Therefore, the aspect ratio (H (height)/W (width)) becomes smaller.

Figure 10A:
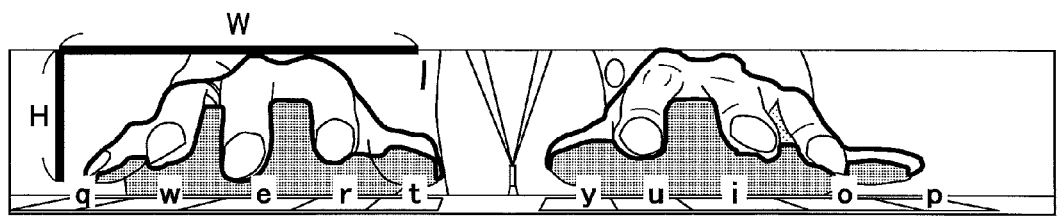
FIG. 10A is a schematic view illustrating an example of a hand area when operating an upper row.

FIG. 10A is a schematic view illustrating an example of a hand area when operating on the upper row. As illustrated in FIG. 10A, the aspect ratio R' becomes smaller. In the example illustrated in FIG. 10A, the height (H) and width (W) are displayed only for the left hand. This is the same for FIGS. 10B and 10C.

When inputting with a key in the middle row of the virtual keyboard, the positions are the same as the home positions, with which the aspect ratio R' is the same as R when determining the reference pushdown line.

Figure 10B:
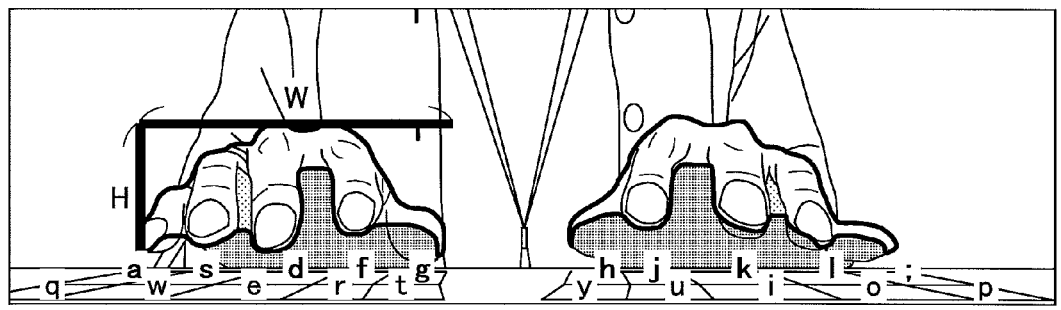
FIG. 10B is a schematic view illustrating an example of a hand area when operating a middle row.

FIG. 10B is a schematic view illustrating an example of a hand area when operating on the middle row. As illustrated in FIG. 10B, the aspect ratio R' for this case is the same as the aspect ratio R during the calibration.

When inputting with a key in the lower row of the virtual keyboard, the fingers moves towards the user (closer to the user), which makes the fingers form an upright shape. Therefore, the aspect ratio R' becomes greater.

Figure 10C:
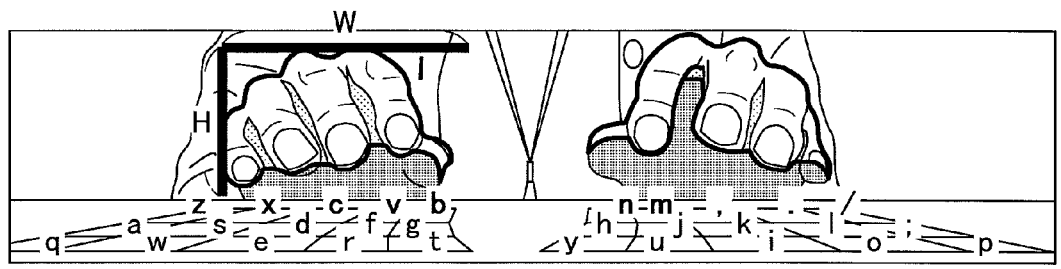
FIG. 10C is a schematic view illustrating an example of a hand area when operating a lower row.

FIG. 10C is a schematic view illustrating an example of a hand area when operating on the lower row. As illustrated in FIG. 10C, the aspect ratio R' becomes greater.

As illustrated in FIGS. 10A-10C, the inventors discovered that the hand area of a user changes depending on the depth position of an input key (a key pushed down by the user). Based on this discovery, it is possible to estimate the position of a hand in the depth direction using the aspect ratio of the hand area of a user.

The depth position determining section 215 outputs the determined position in the depth direction (for example, one of the upper row (row for Q and Y), the middle row (row for A and H), and the lower row (row for Z and N)) to the input key determining section 216.

The input key determining section 216 can uniquely determine the key (input key) pushed down by a user from the lateral position obtained from the lateral position determining section 214 and the depth position obtained from the depth position determining section 215.

Figure 11:
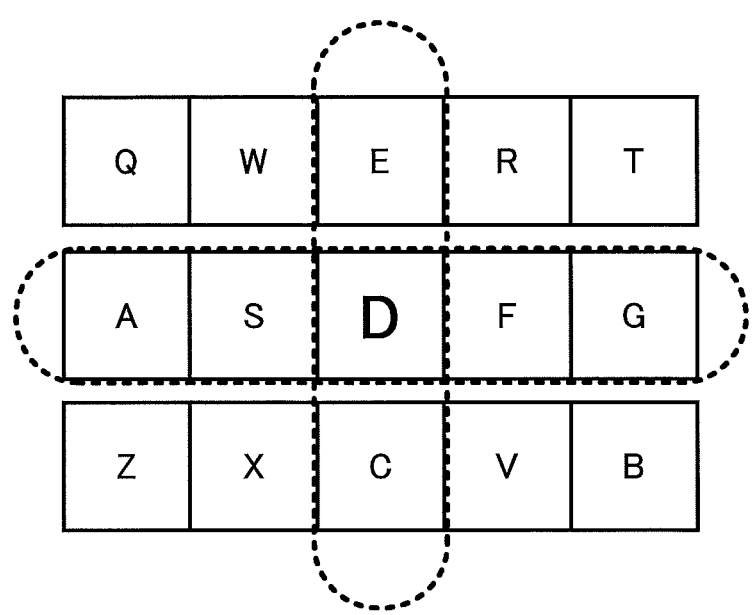
FIG. 11 is a schematic view illustrating an example of input key determination.

FIG. 11 is a schematic view illustrating an example of input key determination. In the example illustrated in FIG. 11, input is made with a left hand, the lateral position designates the column with "E", and the depth position designates the row with "A" (middle row), and the input key is determined as "D".

The input key determining section 216 stores the input command corresponding to the determined input key into the storage section 203. In this case, the input command is a character code. The character codes stored into the storage section 203 may be output as a string on the display section 105.

<Operations>

Next, operations of the information processing apparatus 10 will be described according to the first embodiment.

(Calibration Procedure)

Figure 12:
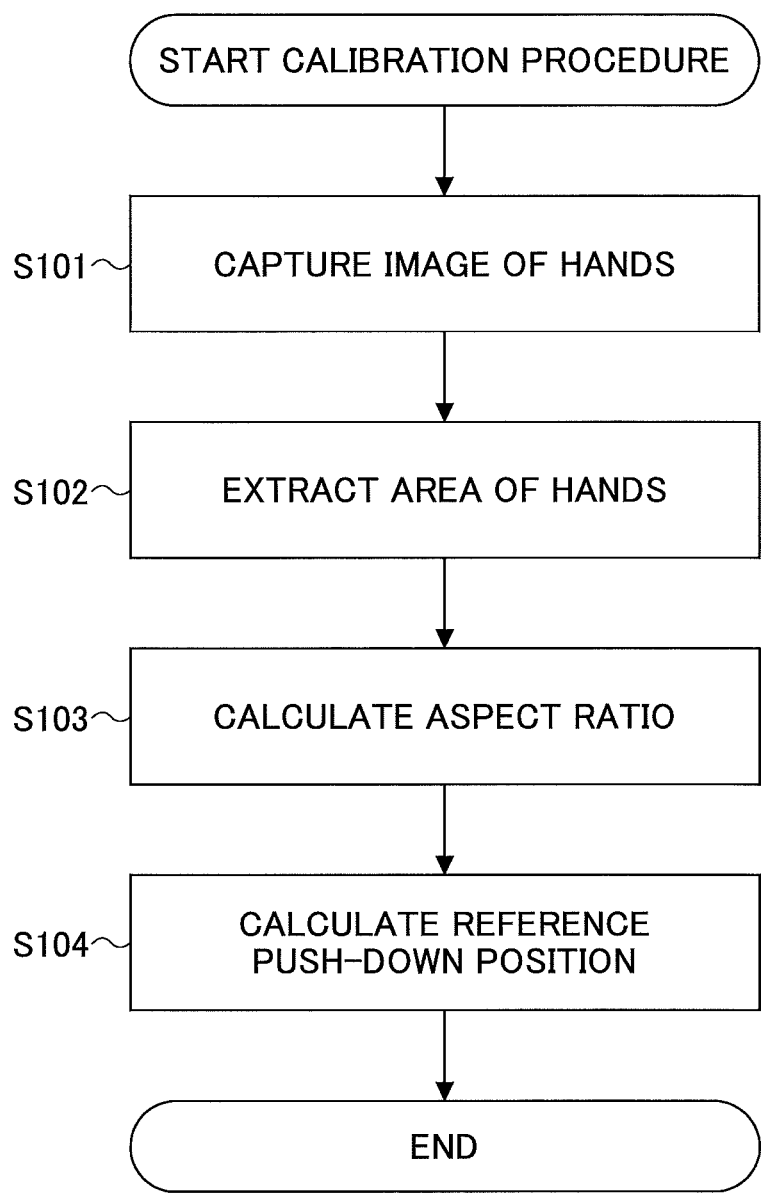
FIG. 12 is a flowchart illustrating an example of a calibration procedure according to a first embodiment.

FIG. 12 is a flowchart illustrating an example of the calibration procedure according to the first embodiment. At Step S101 illustrated in FIG. 12, the image capturing section 202 captures an image of hands of a user. At this moment, for example, the hands of the user take the forms at the home positions.

At Step S102, the extracting section 211 extracts the hand area from the image captured by the image capturing section 202.

At Step S103, the extracting section 211 calculates a reference aspect ratio R using the extracted hand area. The extracting section 211 may calculate threshold values TH using the aspect ratio R, and output them to the depth position determining section 215.

At Step S104, the reference line determining section 212 calculates a reference pushdown line used for determining a key pushdown move based on the extracted hand area. The reference line determining section 212 calculates, for example, the distance M from the upper end of the image to set the position of the distance M from the upper end of the image as the reference pushdown line. This brings the calibration procedure to the end.

(Key Input Procedure)

Figure 13:
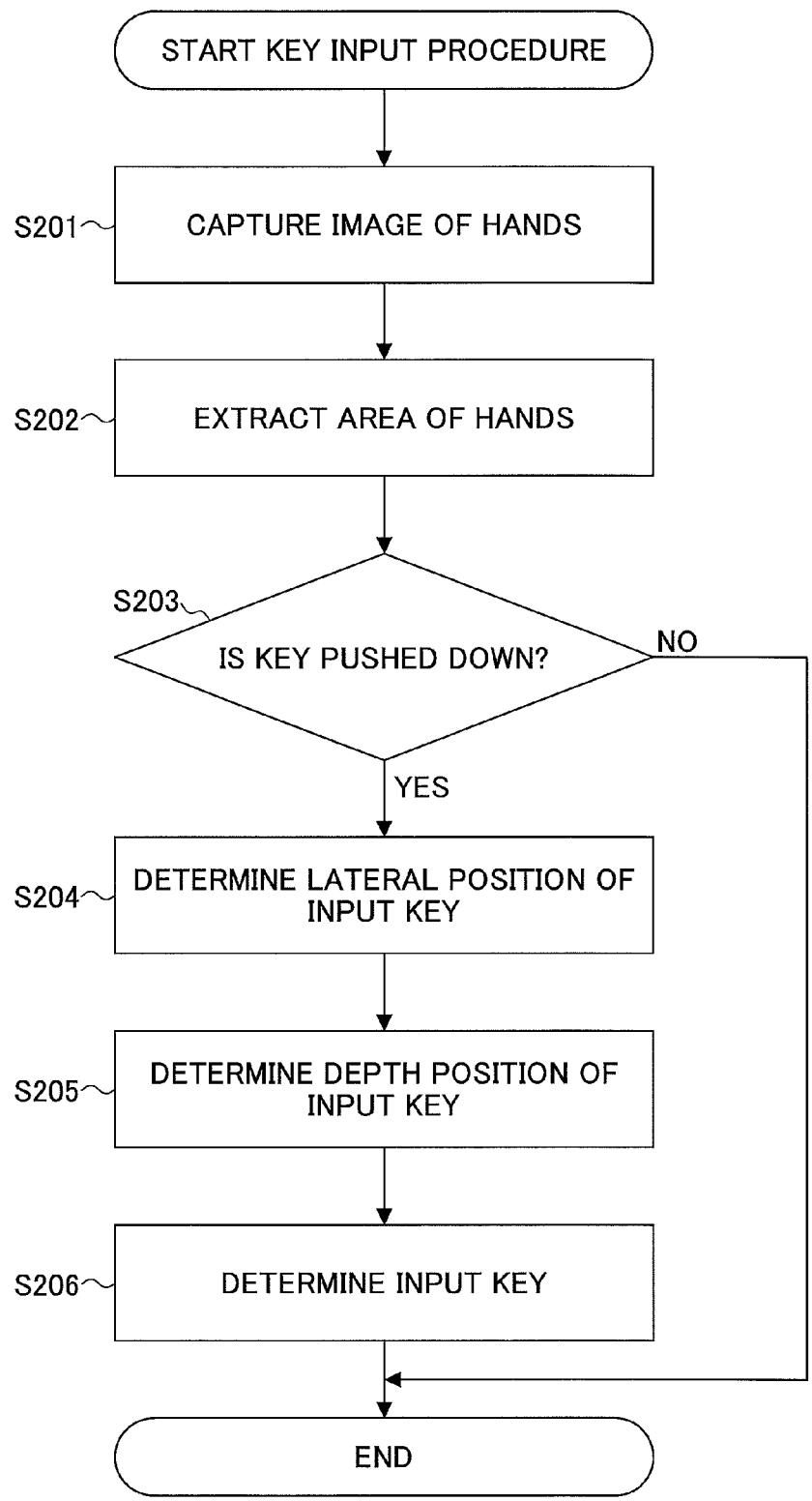
FIG. 13 is a flowchart illustrating an example of a key input procedure according to the first embodiment.

FIG. 13 is a flowchart illustrating an example of a key input procedure according to the first embodiment. The key input procedure illustrated in FIG. 13 is a procedure for a single frame.

At Step S201, the image capturing section 202 captures an image of hands of a user. In this case, the user, for example, performs key input operations on a desk that is likened to a keyboard.

At Step S202, the extracting section 211 extracts the hand area from the image captured by the image capturing section 202.

At Step S203, the determining section 213 compares the bottom part of the extracted hand area and the reference pushdown line to determine whether the bottom part comes below the reference pushdown line. If it is determined that the bottom part is pushed down below the reference pushdown line (Step S203—YES), the procedure goes forward to Step S204, or if it is not determined that the bottom part is pushed down below the reference pushdown line (Step S203—NO), the next frame is going to be processed.

At Step S204, the lateral position determining section 214 determines the lateral position of the input key based on the position of the bottom part of the extracted hand area. For example, the lateral position is determined using the position of the bottom part relative to the width of the hand area.

At Step S205, the depth position determining section 215 compares the calculated aspect ratio R' and the threshold values TH to determine the depth position of the input key.

At Step S206, the input key determining section 216 determines the input key from the determined lateral position and the determined depth position. This brings the key input procedure for a frame to the end.

(Hand Area Extracting Procedure)

Next, a hand area extracting procedure will be described. As described above, input key determination can be performed with better precision by extracting a hand area having a palm part removed. Therefore, a hand area extracting procedure with removal of a palm part will be described concretely using FIG. 14.

Figure 14:
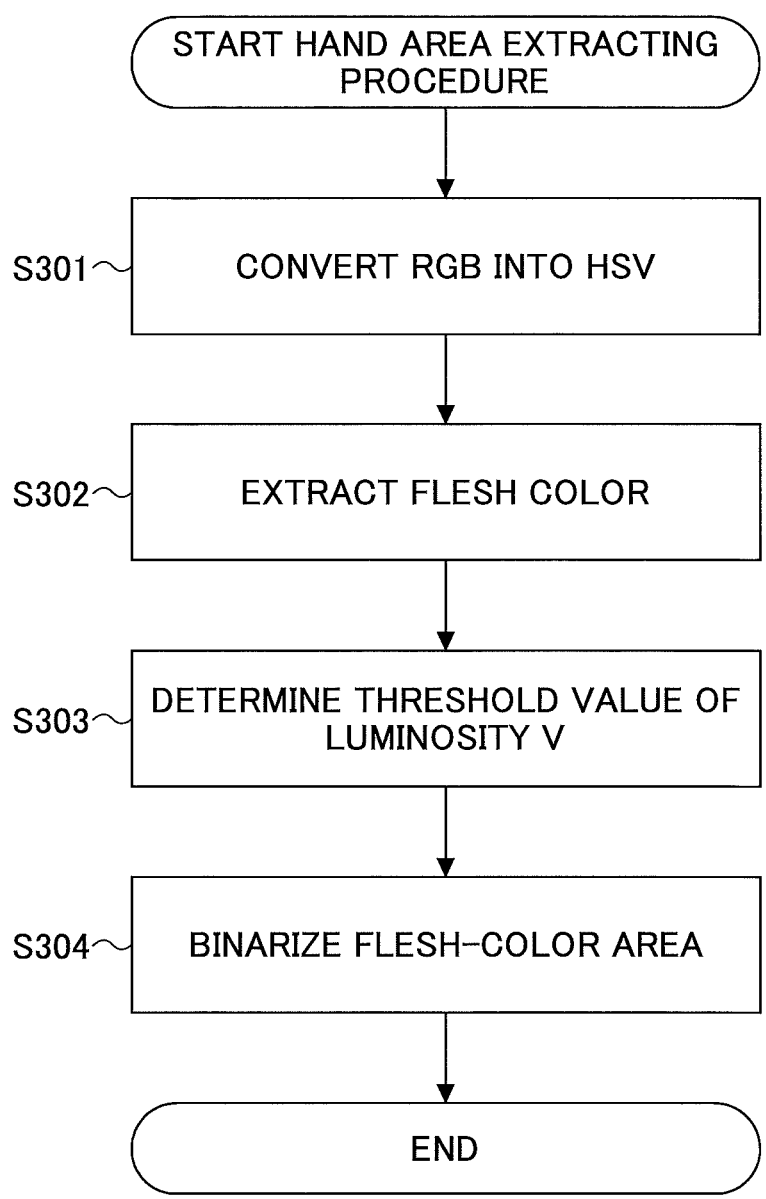
FIG. 14 is a flowchart illustrating an example of a hand area extracting procedure.

FIG. 14 is a flowchart illustrating an example of the hand area extracting procedure. At Step S301, the extracting section 211 converts RGB values of an image into HSV values that use hue, colorfulness, and luminosity.

At Step S302, the extracting section 211 extracts a flesh color from the HSV values.

At Step S303, the extracting section 211 determines whether the luminosity V of the extracted flesh color area is greater than a predetermined threshold value. The predetermined threshold value may be set to an appropriate value based on an experiment.

At Step S304, the extracting section 211 binarizes the flesh color area using the luminosity V. For example, the extracting section 211 sets "1" if the luminosity V is greater than the threshold value, or sets "0" if the luminosity V is less than the threshold value luminosity V. Then, removing a part of area set with "0", the palm part can be removed from the flesh color area. The extracting section 211 may set the flesh color area having the palm part removed as the hand area.

In the procedure illustrated in FIG. 14, by extracting edges of fingers to remove a palm part so that the upper surface of the hand is extracted to be set as the hand area, an erroneous input by the palm part can be avoided. Also, by extracting only the upper surface of the hand, the palm part is prevented from being recognized as the bottom part of the hand area.

Here, although RGB values are converted into HSV values in the procedure illustrated in FIG. 14, RGB values may be converted into YUV values that represent brightness and color difference. In this case, a palm part can be deleted by determining with a threshold value using brightness Y.

Also, although determination with the threshold value using luminosity V (or brightness Y) is described in the procedure illustrated in FIG. 14, an opposite determination result may be obtained with the threshold value using luminosity V (or brightness Y) depending on characteristics of a flesh color of an individual person or a lighting environment. Further, the hand area extracting procedure may perform determination with threshold values taking hue H and colorfulness S (or color difference UV) into consideration.

As above, it is possible to perform key inputs based on three dimensional positions of fingers estimated from an image captured by a single camera in a single direction according to the first embodiment. Also, it is possible to reduce the cost of a device and to make the installation of an input device using a virtual keyboard easy because only one camera is required.

Also, according to the first embodiment, by deleting a palm part when extracting a hand area, an erroneous input by the palm part as the bottom part can be avoided and input precision with a virtual keyboard can be improved.

Also, a virtual keyboard according to the first embodiment can improve operability because the keys are determined following movements of hands, which expands the movable space of the hands of a user larger than the space available with a conventional technology.

Here, the display section 105 may display an image captured by the image capturing section 202, or display a string corresponding to the character codes stored into the storage section 203. Also, the display section 105 may display a captured image superposed with a virtual keyboard when displaying the captured image. The virtual keyboard may be superposed based on the position of the hand areas extracted by the extracting section 211.

The information processing apparatus 10 may display on the screen, for example, how it recognizes an operation on the virtual keyboard. Alternatively, the information processing apparatus 10 may not display a screen for operations on the virtual keyboard if a user can perform touch typing.

The examples illustrated in FIGS. 6, 7, and 10 can be viewed as examples of captured images superposed with the virtual keyboard. Also, the display section 105 may display the virtual keyboard as a whole, or display only selected keys.

For example, the display section 105 may obtain a lateral position (key) determined by the lateral position determining section 214 or a depth position (key) determined by the depth position determining section 215 to highlight the key.

[Second Embodiment]

Next, an information processing apparatus 10 will be described according to a second embodiment. According to the second embodiment, instead of an estimation procedure for a lateral position, a finger estimation procedure is performed, and keys are arranged so that they correspond to the fingers estimated beforehand.

As the hardware of the information processing apparatus 10 and the functional configuration according to the second embodiment are the same as those in the first embodiment, the same numeral codes as in the first embodiment will be used for description. According to the second embodiment, the lateral position determination procedure by the lateral position determining section 214 differs from that of the first embodiment.

<Functions>

The lateral position determining section 214 of the information processing apparatus 10 extracts a color of nails to estimate fingers according to the second embodiment. Also, the lateral position determining section 214 may assign markers or the like to the fingers, and estimate the fingers by recognizing the markers by image processing. Also, the fingers may be estimated by characteristic values of the form of the fingers (a semicircular shape of a fingertip or the like).

The lateral position determining section 214 identifies a finger by estimating from the position of the finger in the hand area. For example, the leftmost finger in the left hand area is determined as the little finger, followed by the ring finger, the middle finger, and the index finger.

The lateral position determining section 214 for example, assigns "J" to the index finger of the right hand at the home position, "K" to the middle finger of the right hand, and "F" to the index finger of the left hand. This makes it possible to determine which key (lateral position) is pushed down in the lateral direction by determining which finger is pushed down.

Here, the index finger has two keys assigned. In this case, the lateral position determining section 214 can identify which one of the keys "J" and "H" is pushed down, for example, based on the amount of pushdown movement of the index finger of the right hand.

Specifically, the lateral position determining section 214 obtains the amount of movement in the lateral direction from the position of the index finger of the right hand when pushed down and the position of the index finger of the right hand in the previous frame of the image. With this amount of movement, it can be determined whether the finger has been pushed straight down from the home position, or pushed down obliquely. If the finger has been pushed straight down, the input key is determined as "J", or if the finger has been pushed down obliquely, the input key is determined as "H". The index finger of the left hand has substantially the same determination procedure applied.

The lateral position determining section 214 outputs the column of the determined key to the input key determining section 216. The other functions are the same as in the first embodiment.

<Operations>

Operations of the information processing apparatus 10 will be described according to the second embodiment. The step differs from the first embodiment is Step S204 illustrated in FIG. for determining an input key in the lateral direction.

According to the second embodiment, the lateral position determining section 214 estimates a finger in the hand area to determine which finger is pushed down at Step S204. The lateral position determining section 214 determines the input key (lateral position) in the lateral direction from the determined finger and the position of the finger if necessary. The other steps are the same as in the first embodiment.

As above, according to the second embodiment, it is possible to estimate which finger is pushed down, and to obtain the same effects as in the first embodiment.

Here, although the finger estimation procedure is performed for determining the lateral position according to the second embodiment, it may be combined with the lateral position determination procedure in the first embodiment. In this case, the lateral position determining section 214 determines the input key in the lateral direction based on a pushed finger and the position of the finger in the hand area. For example, if the index finger of the right hand is estimated to be the pushed finger, the input key is determined to be "J" or "H" depending on the position of the index finger of the right hand in the right hand area.

Also, the determining section 213 according to the second embodiment may use another method of determining a key pushdown move as follows. The determining section 213 makes comparison with the reference pushdown line for each of the estimated finger to determine that key pushes have been done for the fingers that are below the reference pushdown line.

By determining with the reference pushdown line for each finger, input can be done with multiple fingers at once, which makes an input operation faster than with the determination just using the bottom part.

[Third Embodiment]

Next, an information processing apparatus will be described according to a third embodiment. According to the third embodiment, multiple reference pushdown lines are provided to reduce erroneous determination of key pushes.

As the hardware of the information processing apparatus 10 and the functional configuration according to the third embodiment are the same as those in the first embodiment, the same numeral codes as in the first embodiment will be used for description. The reference line determining section 212 determines a reference pushdown line for each input row of a virtual keyboard according to the third embodiment.

<Functions>

The reference line determining section 212 of the information processing apparatus 10 determines a reference pushdown line for each input row of a virtual keyboard according to the third embodiment. For example, the calibration procedure illustrated in FIG. 12 is executed for each of the input rows. For the virtual keyboard illustrated in FIG. 5, reference pushdown lines are determined for the upper row, middle row, and lower row, respectively.

The reference line determining section 212 indicates a reference pushdown line associated with each of the input rows of the virtual keyboard to the determining section 213. The determining section 213 stores the reference pushdown lines associated with the respective input rows of the virtual keyboard.

The depth position determining section 215 determines the depth position based on an aspect ratio R of a hand area obtained from the extracting section 211. In this case, for example, if it is determined that the current aspect ratio R' indicates the upper row, the depth position determining section 215 indicates to the determining section 213 that the depth position is the upper row.

Obtaining the depth position from the depth position determining section 215, the determining section 213 determines a key pushdown move using the reference pushdown line for the input row corresponding to the depth position. Determination of a key pushdown move is the same as in the first embodiment. The other functions are the same as in the first embodiment.

<Operations>

Next, operations of the information processing apparatus 10 will be described according to the third embodiment. The calibration procedure is executed for each of the input rows of the virtual keyboard according to the third embodiment. For example, following guidance on the display section 105, a reference pushdown line is determined based on the hand area for one of the input rows.

(Key Input Procedure)

Figure 15:
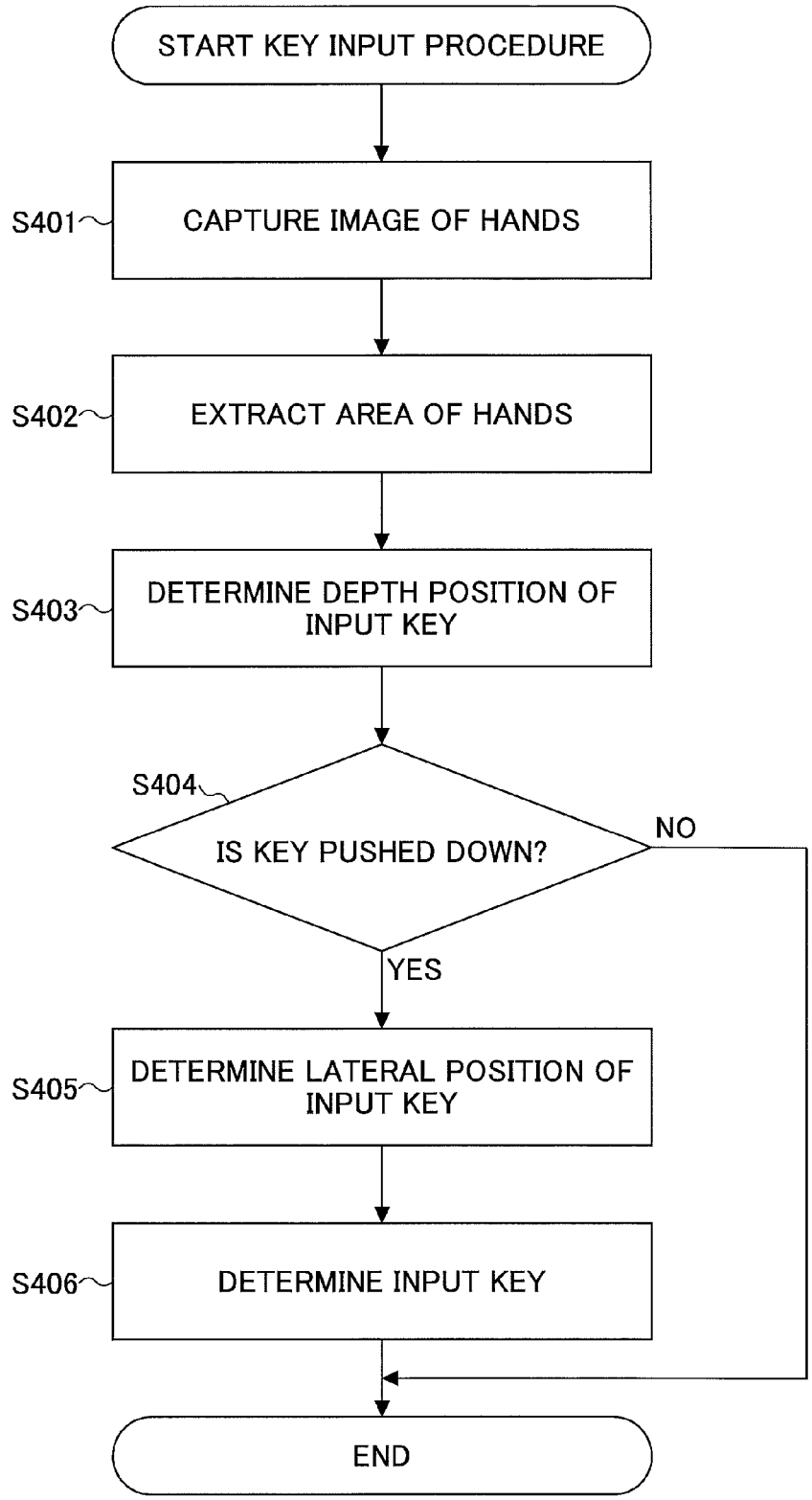
FIG. 15 is a flowchart illustrating an example of a key input procedure according to a third embodiment.

FIG. 15 is a flowchart illustrating an example of a key input procedure according to the third embodiment. The key input procedure illustrated in FIG. 15 is a procedure for a single frame.

At Step 401, the image capturing section 202 captures an image of hands of a user. In this case, the user, for example, performs key input operations on a desk that is likened to a keyboard.

At Step S402, the extracting section 211 extracts the hand area from the image captured by the image capturing section 202. R' is calculated from the extracted hand area.

At Step S403, the depth position determining section 215 compares a calculated aspect ratio R' with threshold values TH to determine a input key depth position.

At Step S404, the determining section 213 compares the reference pushdown line corresponding to the determined depth position and the bottom part of the extracted hand area to determine whether the bottom part comes below the reference pushdown line. If it is determined that the bottom part is pushed down below the reference pushdown line (Step S404—YES), the procedure goes forward to Step S405, or if it is not determined that the bottom part is pushed down below the reference pushdown line (Step S404—NO), the next frame is going to be processed.

At Step S405, the lateral position determining section 214 determines the lateral position of the input key based on the position of the bottom part of the extracted hand area. For example, the lateral position is determined using the position of the bottom part relative to the width of the hand area.

At Step S406, the input key determining section 216 determines the input key from the determined lateral position and the determined depth position. This brings the key input procedure for a frame to the end.

As above, according to the third embodiment, it is possible to perform a key input depending on a three dimensional position of a finger in that the position is estimated based on a captured image taken by a camera in a single direction, and to determine a key pushdown move with improved precision.

[Modified Example]

Next, a modified example will be described. In the above embodiments, although a keyboard has been described as an example of an interface, it is possible to apply the above embodiments to menu selection buttons and pointing operations.

Also, in the above embodiments, although a virtual keyboard with three rows has been described as an example, the number of rows is not limited to three, but four, five, or the like. In these cases, three threshold values in the depth direction may be set for four input rows, and four threshold values may be set for five input rows.

In the modified example, it is possible to have a computer system execute the procedures described in the above embodiments by recording a program implementing the input control methods illustrated in FIGS. 12-15 into a recording medium.

In this way, the input control procedures described in the embodiments may be implemented as a program to be executed by a computer. By installing the program in a computer from a server or the like and executing the program, the input control procedures described above can be implemented.

Also, it is possible to implement the above input control procedures by recording the program on a recording medium and having a computer or a portable terminal read the recording medium on which the program is recorded.

Here, various types of recording media can be used including a recording medium that records information optically, electrically, or magnetically such as a CD-ROM, a flexible disk, an optical magnetic disk and the like, and a semiconductor memory and the like that records information electrically such as a ROM, a flash memory, and the like.

The program executed on the information processing apparatus 10 in the embodiments has a modular configuration including the sections described above. In actual hardware, the control section 101 may read the program from the auxiliary storage section 103 and execute it so that one or more of the sections are loaded into the main memory section 102, and one or more of the sections are generated in the main memory section 102.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising:
    a camera serving as an image capturing section configured to capture an image of a hand;
    a memory device configured to store a program; and
    a central processing unit configured to execute the program to perform operations of:
    an extracting section configured to extract a hand area from the image input by the image capturing section;
    a reference line determining section configured to determine a predetermined line in the image as a reference pushdown line based on the hand area;
    a determining section configured to determine a pushdown move if the bottom part of the hand area comes below the reference pushdown line;
    a first position determining section configured to determine a depth position based on an aspect ratio of the hand area if the pushdown move is determined by the determining section, wherein the aspect ratio of the hand area is a ratio of a height of the hand area to a width of the hand area, and a depth indicated by the determined depth position increases in response to a change in the aspect ratio when the height of the hand area increases relative to the width of the hand area;
    a second position determining section configured to determine a lateral position based on a position of the bottom part of the hand area if the pushdown move is determined by the determining section; and
    an input key determining section configured to determine an input key from the determined depth position and lateral position.

2. The information processing apparatus as claimed in claim 1, wherein the extracting section calculates an aspect ratio of the hand area as a reference, and sets one or more threshold values based on the aspect ratio,
    wherein the first position determining section determines the depth position by comparing the threshold values and the aspect ratio of the hand area when the pushdown move is determined by the determining section.

3. The information processing apparatus as claimed in claim 2, wherein the determining section changes the reference pushdown line depending on the aspect ratio of the hand area.

4. The information processing apparatus as claimed in claim 1, wherein the second position determining section determines the lateral position based on a lateral width of the hand area and the position of the bottom part of the hand area.

5. The information processing apparatus as claimed in claim 1, wherein the second position determining section estimates which finger corresponds to the bottom part of the hand area, and based on the estimated finger, determines the lateral position.

6. The information processing apparatus as claimed in claim 1, wherein the extracting section extracts the hand area having a palm part removed based on luminosity or brightness.

7. The information processing apparatus as claimed in claim 1, wherein the reference line determining section determines the reference pushdown line for each of a plurality of input rows in the depth direction.

8. The information processing apparatus as claimed in claim 1, further comprising:
    a display section configured to display the image superposed with a virtual keyboard, and to highlight a key corresponding to a position determined by the first position determining section or the second position determining section.

9. An input control method executed by a computer, the method comprising:
    capturing an image of a hand;
    extracting a hand area from the image;
    determining a predetermined line in the image as a reference pushdown line based on the hand area;
    determining a pushdown move if the bottom part of the hand area comes below the reference pushdown line;
    determining a depth position based on an aspect ratio of the hand area if the pushdown move is determined, wherein the aspect ratio of the hand area is a ratio of a height of the hand area to a width of the hand area, and a depth indicated by the determined depth position increases in response to a change in the aspect ratio when the height of the hand area increases relative to the width of the hand area;
    determining a lateral position based on a position of the bottom part of the hand area if the pushdown move is determined; and
    determining an input key from the determined depth position and lateral position.

10. A non-transitory computer-readable recording medium having a program stored therein for causing a computer to execute an input control method, the method comprising:
    capturing an image of a hand;
    extracting a hand area from the image;
    determining a predetermined line in the image as a reference pushdown line based on the hand area;
    determining a pushdown move if the bottom part of the hand area comes below the reference pushdown line;
    determining a depth position based on an aspect ratio of the hand area if the pushdown move is determined, wherein the aspect ratio of the hand area is a ratio of a height of the hand area to a width of the hand area, and a depth indicated by the determined depth position increases in response to a change in the aspect ratio when the height of the hand area increases relative to the width of the hand area;

determining a lateral position based on a position of the bottom part of the hand area if the pushdown move is determined; and determining an input key from the determined depth position and lateral position.

* * * * *